Dec. 5, 1933.  W. H. GINDER  1,937,562
TOASTING APPARATUS
Filed Dec. 10, 1929   4 Sheets-Sheet 1
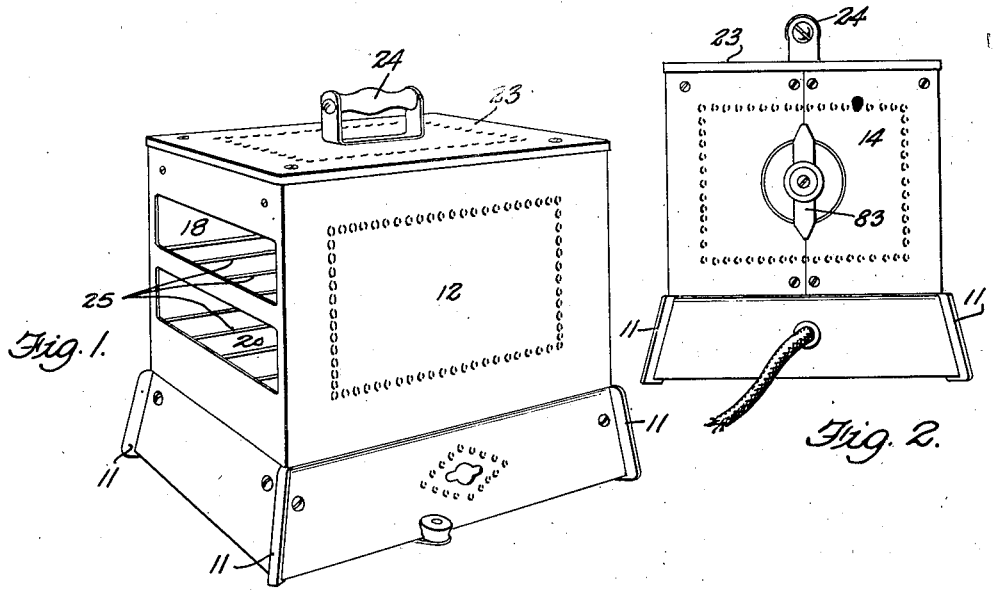
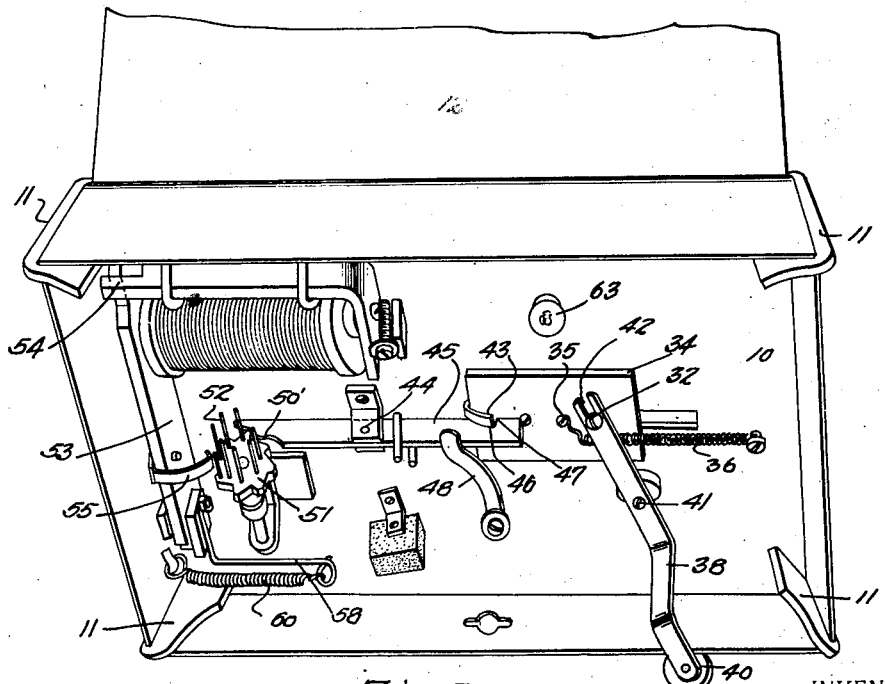
INVENTOR.
William H. Ginder.
BY Frank H. Borden
ATTORNEY.

Dec. 5, 1933.  W. H. GINDER  1,937,562
TOASTING APPARATUS
Filed Dec. 10, 1929   4 Sheets-Sheet 2

INVENTOR.
William H. Ginder.
BY Frank H. Borden.
ATTORNEY.

Dec. 5, 1933.    W. H. GINDER    1,937,562
TOASTING APPARATUS
Filed Dec. 10, 1929    4 Sheets-Sheet 4

INVENTOR.
William H. Ginder.
BY Frank H. Borden
ATTORNEY.

Patented Dec. 5, 1933

1,937,562

UNITED STATES PATENT OFFICE 1,937,562

TOASTING APPARATUS

William H. Ginder, Haddonfield, N. J., assignor to Electro Manufacturing Company of America, Philadelphia, Pa., a company of Pennsylvania Application December 10, 1929
Serial No. 413,124

1 Claim. (Cl. 219—19)

This invention relates to toasting apparatus and more particularly to electric toasters.

Among the objects of the invention are; to provide a toaster which ejects the toast when the toasting is completed; to provide a toaster which deposits the toasted slices upon a separate and detached receptacle; to improve generally the construction of toasting apparati; to provide an electric timing switch of improved construction; to reduce the cost of electric toasters; to provide a toaster with a visible or audible signal to indicate the completion of the toasting operation; to provide a toaster of increased efficiency; to provide a toaster with means for ejecting the toast which may be arranged for either complete or partial ejection thereof; to provide an electric toaster with a time controlled device which is substantially silent in operation; to provide a time controlled trip mechanism of general application; and many other objects and advantages as will become more apparent as the description proceeds.

In the accompanying drawings:

Fig. 1 represents a perspective of the preferred form of toaster,

Fig. 2 represents an end elevation of the same,

Figure 4:
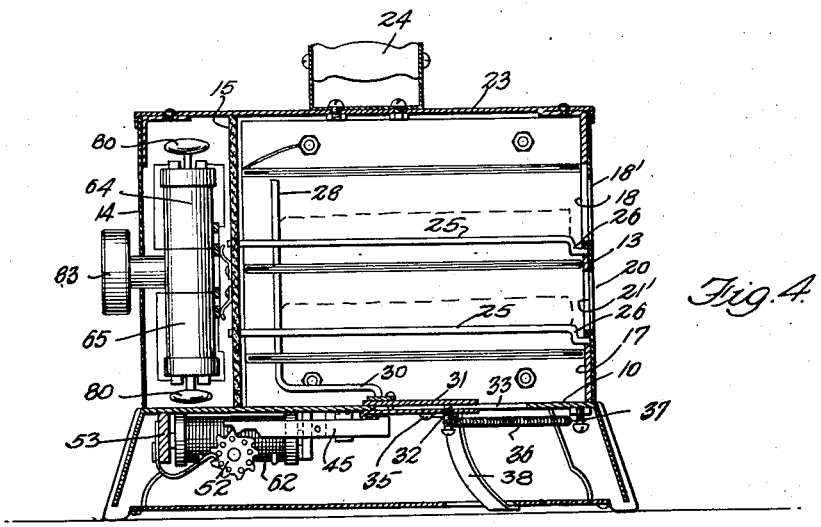
Figure 5:
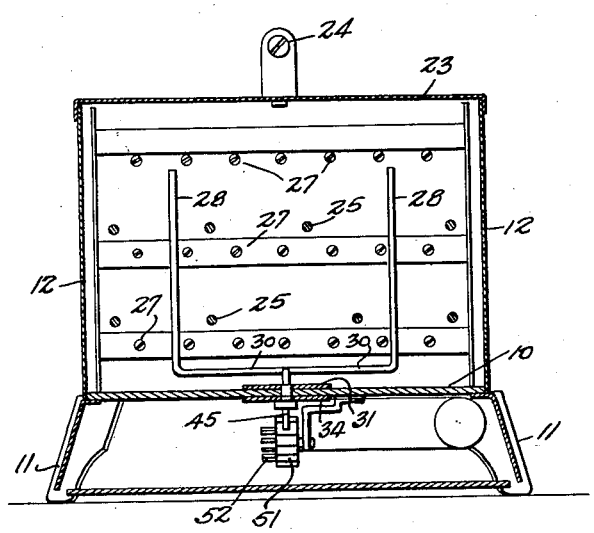
Figure 6:
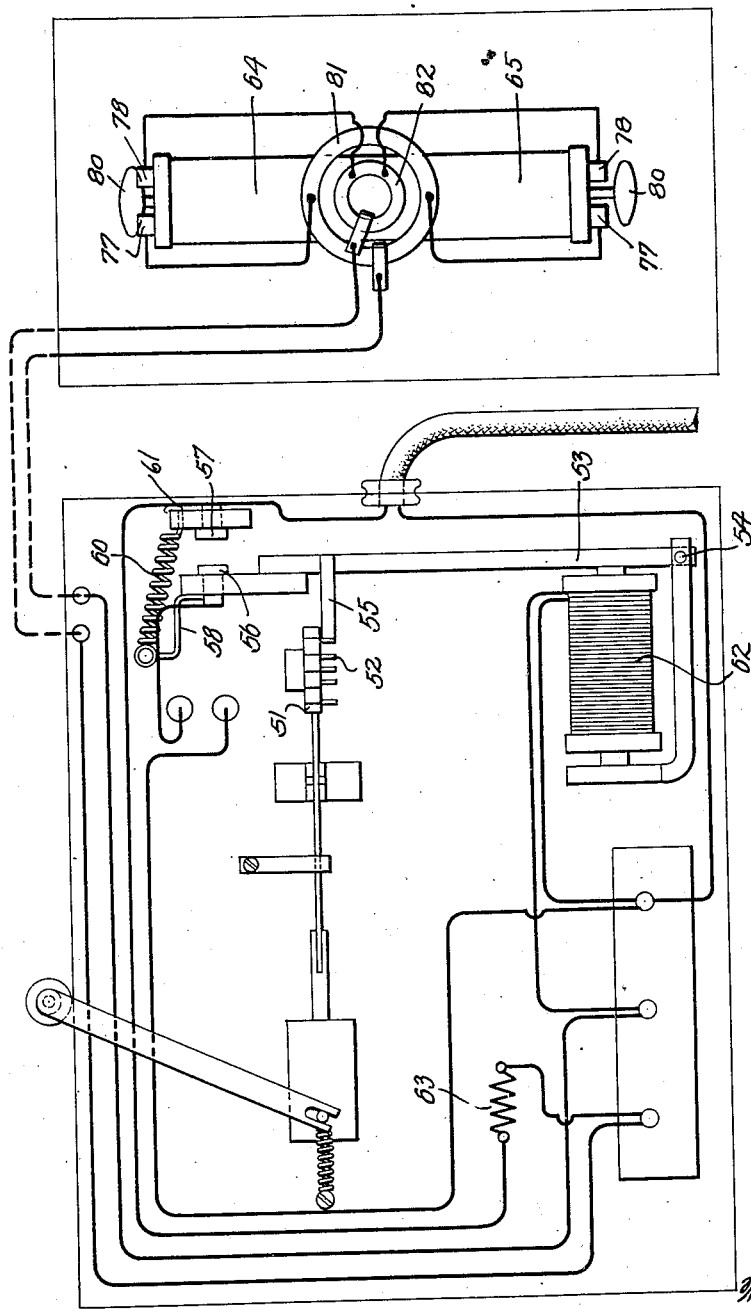
Figure 7:
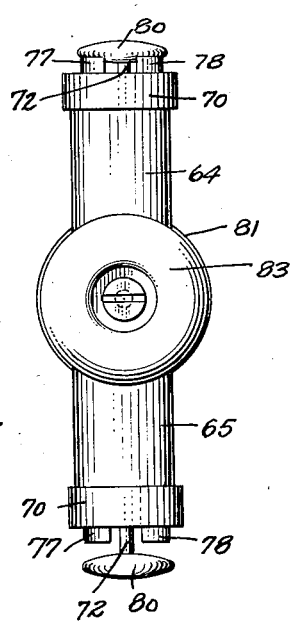
Figure 8:
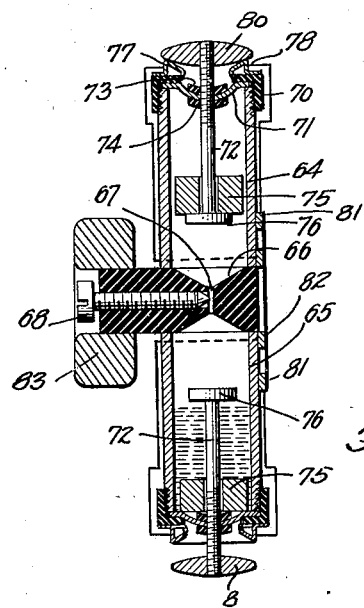
Figure 9:
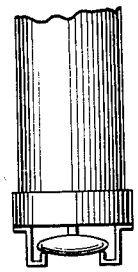

Fig. 3 represents a perspective of the bottom of the toaster to show the relation of the operating parts, Fig. 4 represents a vertical section longitudinally of the toaster to show the relation of the parts prior to the ejection of the toast, Fig. 5 represents a vertical section through the structure of Fig. 4, Fig. 6 represents a diagrammatic view of the wiring and circuits through the toaster, Fig. 7 represents a front elevation of the improved timing device of the invention, Fig. 8 represents a vertical section through the timing device, and Fig. 9 represents a vertical section through a modified form of timing device.

The toaster according to the preferred form of this invention comprises a rectangular box completely closed except for one or more horizontally extending slots formed in an end of the receptacle. In its simplest form, the invention comprises a floor or sub base 10, mounted on the upper edges of inwardly extending insulating legs 11 which serve the dual purpose of supporting the toaster on an insulating base, and also, due to their inward extension, forming individual terminal boards to which electrical connections of various sorts may be attached. The exposed surface of the toasting device comprises, preferably, a single sheet of sheet metal bent upon itself to form side walls 12 and end walls 13 and 14. The lower edge of the rectangular casing is supported upon the side edges of the sub base 10 and legs 11 in insulating relation. Spaced inwardly of end wall 14, is a vertical, preferably slotted, insulating sheet 15, defining one end of the toasting chamber. The other end of the toasting chamber is defined and closed by a vertically extending insulating strip 17, having preferably horizontal slits or slots 18 and 20 in registration with slots 18' and 20', formed in the front wall 13 of the toaster. Side walls of insulating material (not shown), may be provided to insulate the side walls 12 from the toasting chamber, and the toaster may be closed by a cover plate 23, having an inner horizontal layer of insulating material as desired. The plate 23 has a handle 24 attached to it for supporting and carrying the toaster.

It will be understood that the registering openings 20, 20' and 18, 18' form mouths through which bread is inserted into the toaster and through which the completed toast is arranged for ejection. To facilitate this action, guiding supports are provided upon which the toast or bread is longitudinally slid by the operator. The guiding supports may assume different forms, but it is preferred to provide a series of laterally spaced, parallel, longitudinally extending wires or rods 25, extending horizontally between the vertical wall 15, and the slotted vertical wall 17. The upper edges of the rods or bars are disposed just above the lower edges of the registering slots 20, 20' and 18, 18' by providing a bend 26 in each rod, as will be clear. The heating elements for a toaster toasting both sides of two slices of bread simultaneously, should be three in number and, obviously, are disposed so that there is a single element below the lower set of guide rods, a single or double row of heating elements disposed just below the upper set of guide rods 25, with a further heating element extending in vertically spaced relation to the upper set of guide rods.

The strands of resistance material extend longitudinally of the toaster as at 27 supported in any desired manner but in such a manner that they are, at least toward the rear of the heating chamber, in substantially parallel spaced relation so as to permit the longitudinal movement of the ejector, to be described later, without contacting with the heating element.

The ejector comprises, preferably, and illustratively, a pair of vertically extending laterally spaced fingers 28. extending vertically between the guiding supports and the strands of heating element, and are joined together at their base by connecting arms 30, rigidly supported upon a plate 31 mounted on the sub base 10 and slidably guided thereon by means of a screw or pin 32 riding in a longitudinal slot 33 in the floor of sub base 10. It will be understood that as plate 31 slides longitudinally of the toaster the ejecting arms 28 will also move forward and backward in such manner as to engage behind a slice of material, as disclosed in dotted lines in Fig. 4, and ejects same through the open mouths at the front of the toaster. The ejector is preferably spring actuated upon the release of a trigger and is reset by hand, as will be explained.

On the lower surface of the sub base or floor 10, a plate 34 is mounted in parallelism with the inner plate 31 connected thereto by the screw 32, having a lug 35 to which a tension spring 36 is attached with its opposite end anchored to the floor as at 37. An arm or lever 38 having a hand piece 40 is pivoted as at 41, with its inner end slotted as at 42 to move in engagement with the extension of screw 32 so that movement of the handle 40 longitudinally of the toaster will cause the plate 34 to slide forward and back relative the sub base 10. A dog 43 is provided on plate 34 and may comprise an integral lug struck up from the plate. In substantial alignment with the slot 33, a pivot pin 44 is mounted upon which trigger arm 45 is pivoted to overlie at one end the plate 34, and provided with a notch or recess 46 having a shoulder 47 for engagement with the dog 43. A spring arm 48 may be provided to bear upon the edge of the trigger arm 45 to cause proper seating of the dog in the recess 46. The opposite end of the trigger arm 45 is provided with a cam 50' arranged for engagement with a star wheel 51, in such manner that rotational movement of the star wheel causes the end of the trigger arm to be depressed, and thus to release the shoulder 47 from its engagement with the dog on the plate 34, to permit plate 34 to slide toward the front of the toaster to eject the toast. The star wheel is suitably journaled for step by step rotation and may be provided with a series of pins 52 extending axially from the face of the star wheel in radially spaced relation to its axis. Toward the rear end of the base a transversely extending arm 53 is pivoted as at 54, carrying a resilient arm 55 in position to engage a pin 52 to advance the star wheel 51 one step upon movement of the arm 53. The outer end of arm 53 is provided with a contact point 56 arranged to close a circuit as, for instance, a circuit through the heating elements by engagement with a stationary contact 57. The free end of arm 53 may carry an arm 58, to which the tension spring 60 is joined, the opposite end of which is anchored as at 61 so that the urge of the spring upon the arm 53 tends to keep the contacts together and the circuit closed. Arranged with its core in close adjacency to the arm 53, is an electro magnet 62, arranged so that when its coil is energized, arm 53 is pulled on its pivot 54 toward the electro magnet 62, thus simultaneously breaking the circuit established by contacts 56 and 57 and simultaneously actuating the star wheel so as to depress the trigger arm and release the sliding plate 34 which, with the circuits appropriately arranged, will simultaneously eject the toast and open the circuits through the heating elements. As it will be desirable to use a resistance with the electro magnet, this may be provided in any desired form such as by connection with the heating elements or by a separate resistance, such as a small pilot light 63, or other resistance, may be mounted on the base so that energization of the electro magnet and ejecting the toast will be accompanied by lighting the pilot light as indication of the completion of the toasting operation.

A serious disadvantage of other electric toasters which are time controlled has been the fact that the clock work mechanism, and the like, which has been used as the timing device has been so noisy as to be objectionable. This invention contemplates the provision of an improved timing switch susceptible to general application in the electric field but particularly valuable in its relation to the toaster in this invention. The timer comprises in the preferred form upper and lower cylindrical chambers, respectively, 64 and 65, separated by a median web 66 having a restricted aperture or port 67 into which a needle valve, or the like, 68 may be adjustably moved to vary the port opening. As the ends are identical the description will be confined to that of chamber 64. The outer end of cylinder 64 is closed by an insulating cap 70 threaded upon the cylinder and bearing upon the outer periphery of a flexible diaphragm 71, preferably of rubber, and having a central aperture through which a threaded shank 72 is slid and anchored firmly to the diaphragm by nuts 73 and 74 forming an air and liquid tight connection. It will be understood that the diaphragm preferably has such resilience as to tend to retain an imparted position moving past "dead center" with a more or less pronounced snap action although it is but necessary that it be sufficiently resilient as to move under the gravitational force of the sliding weight to be mentioned. Shank 72 is loosely embraced by a sliding weight 75, arranged to be stopped at one end by a flange 76 on the shank and in the other by a nut 73. It will be understood that the weight 75 is sufficient to pull the diaphragm inwardly or outwardly against its resilience. The outer face of the insulating cap 70 is provided with diametrically opposite contacts 77 and 78 arranged to be bridged by a contact piece 80 mounted on the outer end of the shank. The chambers are provided with a fluent material of sufficient fluentness as to flow readily through the aperture 67. Such materials may be mercury or fine sand, such as is found in hour glasses, although any desired material may be used. Assuming the time switch to be as disclosed, and arranged for oscillation about an axis coincident with the needle valve 68, (for instance) the chamber 65 being swung up to the position of chamber 64, the fluent material will drop upon the median web 66 and start to pass through the aperture 67, but meanwhile will support the weight 75 and keep its weight from moving the shank until the material has flowed to such a degree that the weight may rest directly upon the flange 76 to move the shank vertically. Chamber 64 having previously been emptied, is free to permit the weight 75 to slide downward upon shank 72 to abut nut 73 and snap the bridge piece 80 from engagement with contacts 77 and 78, to a position spaced therefrom so that immediately upon the reversal of the parts, contact is not being made at either end of the timer. As soon, however, as the fluent material has passed out from under the weight and flange 76 the upper bridge piece is snapped into contact to close the circuit. The fluent material thereunder is pushed aside by the flange 76 and raises the movable weight temporarily as a consequence of the snap action. The timer may carry a pair of concentric collector rings as at 81 and 82 connected electrically to the respective contacts 77 and 78, as will be clear, and which are arranged for brushing engagement with a commutator or other brush contact to conduct current from and to the timer. Although for the purpose of this toaster it is desired that the timer work so as to close a circuit after a predetermined interval, it may equally well be used to open a circuit after a predetermined interval in a manner which will be clear from an inspection of Fig. 9, in which the parts are identical except that the contacts are reversed.

In the diagrammatic disclosure of Fig. 6 the wiring layout is disclosed and it will be understood that the circuit being closed, that is, the toaster plugged into a house circuit, the circuit through the electro magnet will be energized owing to the fact that the conclusion of the timing operation finds one set of contacts bridged, and therefore the arm 53 will be pulled toward the electro magnet at which time the handle 40 may be swung so as to "set" the ejector. A knob 83 concentric with the needle valve 68 extending through end wall 14, is manipulated by the operator so as to turn the timer upside down, which immediately breaks the circuit through the electro magnet and permits the arm 53 to swing to close the circuit through the heating element. Thus the toasting continues for the length of time necessary for the fluent material to pass through the aperture or port in the median web. At the conclusion of the timing period the electro magnet pulls arm 53 toward it, thus breaking the circuit through the heating elements, and ejects the toast, as will be clear.

It will be obvious that the invention is susceptible to many modifications and changes as, that the invention need not in its broadest aspects be limited to toasting devices as the timing device and the time controlled trip mechanism are of general application in the art.

Nor is it necessary that the specific means disclosed be used, as it is contemplated that these may vary with the particular use desired. For instance, it is contemplated that the electro magnet disclosed may comprise a solenoid, or the like, and made operable to trip the ejecting mechanism directly (not shown).

The advantages of the invention will be obvious and need not be entered into in any further detail.

I claim as my invention:

In a toaster, a heating element, contact elements for closing a circuit through the heating element, an arm supporting one contact element, an electro magnet for moving said arm, a device arranged to close the circuit through the electro magnet to move the arm and break the circuit through the heating element, means for horizontally supporting toast, a spring actuated follower arranged to eject the toast on and relative to the support, means for rendering the follower inoperative, and means operable upon the energization of the electro magnet for releasing the follower to eject the toast.

WILLIAM H. GINDER.